(12) United States Patent
Monk et al.

(10) Patent No.: US 8,236,220 B2
(45) Date of Patent: Aug. 7, 2012

(54) METHOD OF MAKING AN EMBEDDED-OBJECT AND COMPOSITE-MATERIAL PRODUCT

(75) Inventors: Russell A. Monk, Salem, OR (US); Thomas S. Ohnstad, Salem, OR (US); Lance A. Hicks, Salem, OR (US)

(73) Assignee: High Impact Technology, LLC, Tigard, OR (US)

( * ) Notice: Subject to any disclaimer, the term of this patent is extended or adjusted under 35 U.S.C. 154(b) by 839 days.

(21) Appl. No.: 11/893,428

(22) Filed: Aug. 15, 2007

(65) Prior Publication Data
US 2008/0044645 A1 Feb. 21, 2008

Related U.S. Application Data

(60) Provisional application No. 60/838,457, filed on Aug. 16, 2006.

(51) Int. Cl.
*B29C 65/00* (2006.01)
*B29C 67/20* (2006.01)
*B29C 63/00* (2006.01)
*B29C 45/14* (2006.01)
*B32B 37/00* (2006.01)
*B29B 13/00* (2006.01)
*D01F 8/00* (2006.01)

(52) U.S. Cl. ............... 264/271.1; 264/171.1; 264/175; 264/248; 264/279

(58) Field of Classification Search .................. None
See application file for complete search history.

(56) References Cited

U.S. PATENT DOCUMENTS

| | | | |
|---|---|---|---|
| 3,429,854 A * | 2/1969 | Rein et al. | 264/547 |
| 3,535,198 A | 10/1970 | Bloom | |
| 4,042,746 A | 8/1977 | Hofer | |
| 4,082,882 A | 4/1978 | Weinstein et al. | |
| 4,130,614 A | 12/1978 | Saidla | |
| 4,500,597 A | 2/1985 | Yazaki et al. | |
| 4,645,710 A | 2/1987 | Baitinger et al. | |
| 4,659,618 A | 4/1987 | Yazaki et al. | |
| 4,764,420 A | 8/1988 | Gluck et al. | |
| 4,963,408 A | 10/1990 | Huegli | |
| 5,518,806 A | 5/1996 | Eder et al. | |
| 5,540,963 A | 7/1996 | Wong | |
| 5,589,243 A | 12/1996 | Day | |
| 5,695,870 A | 12/1997 | Kelch et al. | |

(Continued)

FOREIGN PATENT DOCUMENTS

FR 2 872 085 6/2004

*Primary Examiner* — Christina Johnson
*Assistant Examiner* — Benjamin Schiffman
(74) *Attorney, Agent, or Firm* — Jon M. Dickinson, Esq.; Robert D. Varitz, Esq.

(57) ABSTRACT

An embedded-object composite product including a solid-state mass of PET, an object embedded in the PET material mass, and a zone possessing a continuous material-density gradient in the PET material mass, with more-dense PET material residing closely adjacent the embedded object, and less-dense PET material residing more distant from that object. This product is produced effectively by non-destructively heating the PET mass from its solid state to allow it to flow as a liquid, by then pressing the object into the heated PET mass to perform object embedment and to create a declining PET-material density in the region adjacent, and progressing from adjacent, the embedded object, and by thereafter cooling the mass to re-solidify it.

8 Claims, 3 Drawing Sheets

U.S. PATENT DOCUMENTS

| | | | |
|---|---|---|---|
| 5,888,439 A * | 3/1999 | Miller et al. | 264/248 |
| 6,006,480 A | 12/1999 | Rook | |
| 6,398,899 B1 * | 6/2002 | Umezawa et al. | 156/245 |
| 6,537,413 B1 * | 3/2003 | Hochet et al. | 156/297 |
| 2003/0173014 A1 | 9/2003 | Wardle et al. | |
| 2004/0001946 A1 | 1/2004 | Ma et al. | |
| 2004/0028958 A1 | 2/2004 | Assink et al. | |
| 2004/0101674 A1 | 5/2004 | Ross | |
| 2006/0099383 A1 | 5/2006 | Connelly et al. | |

* cited by examiner

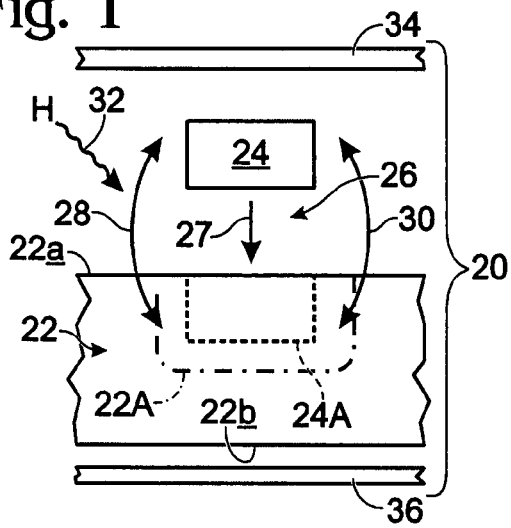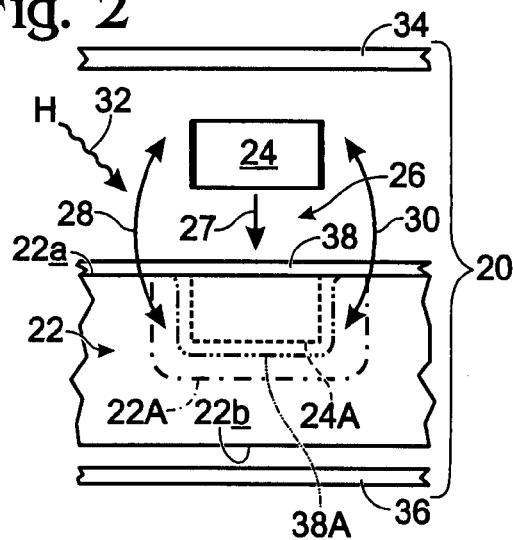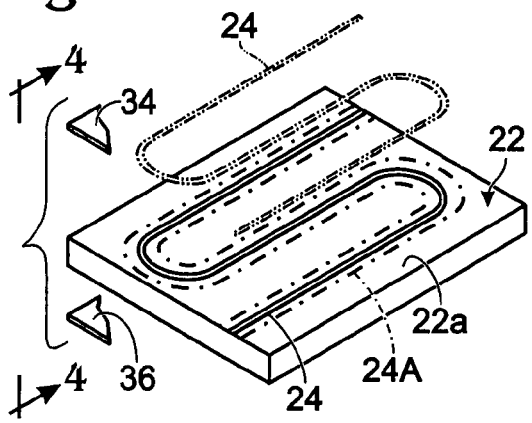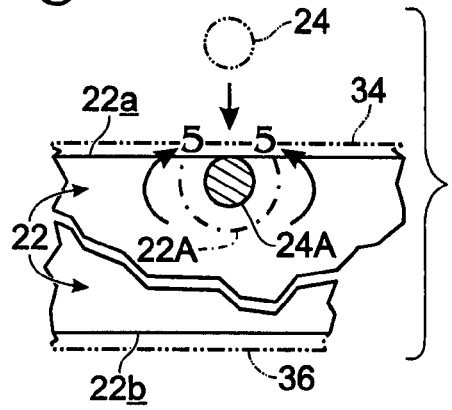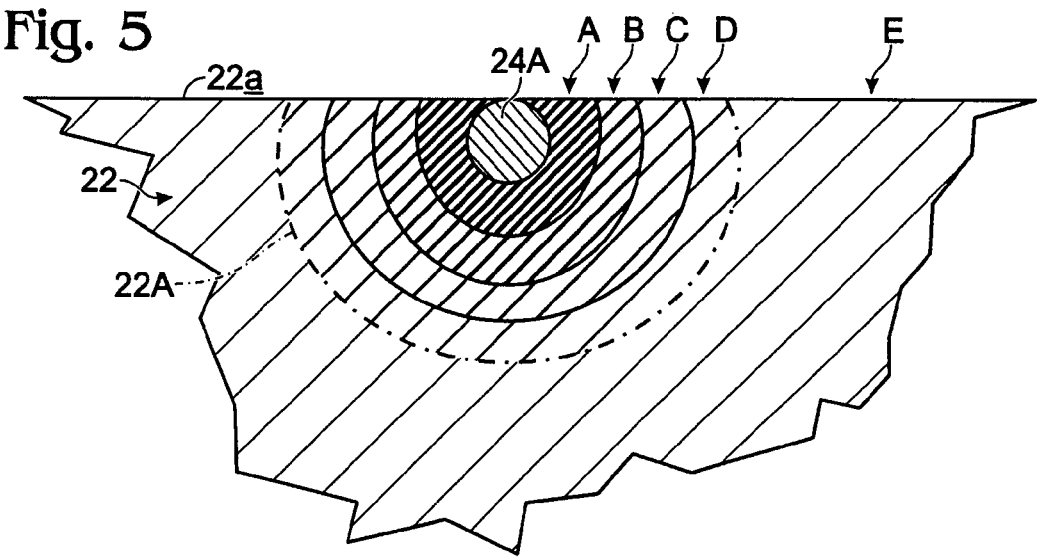

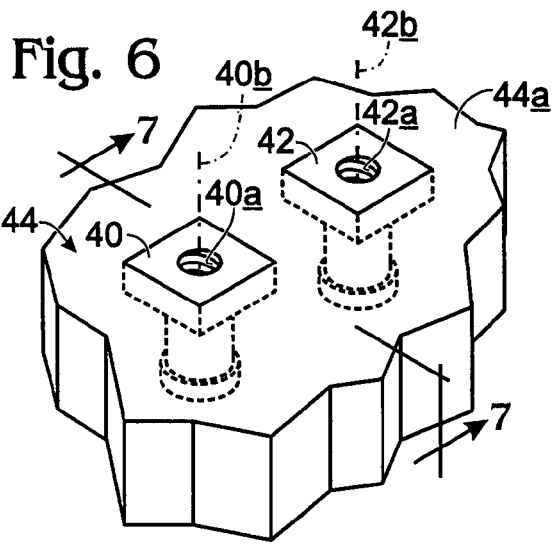
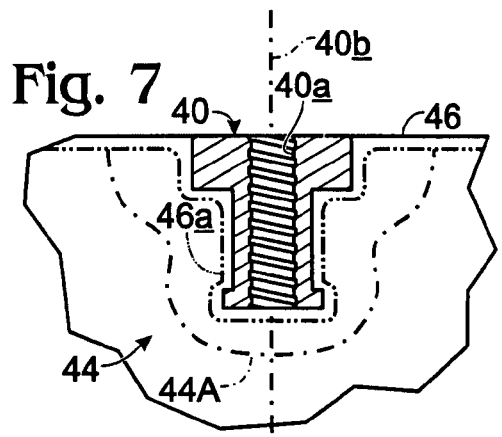
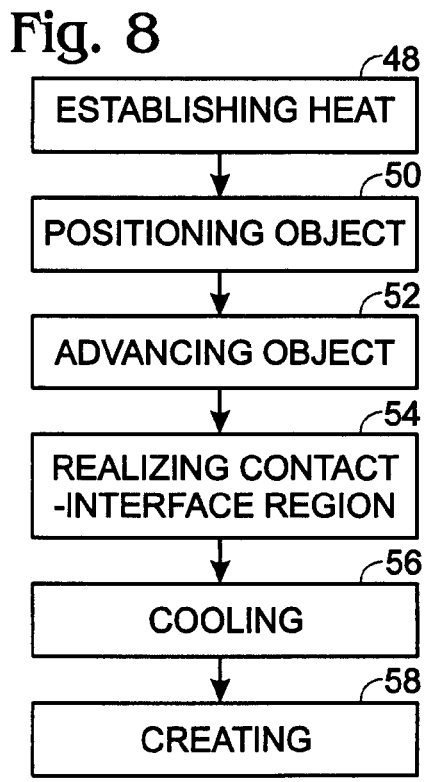
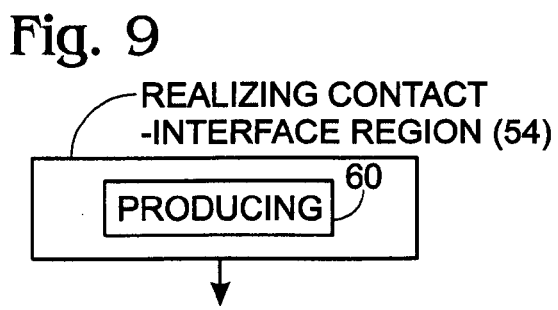
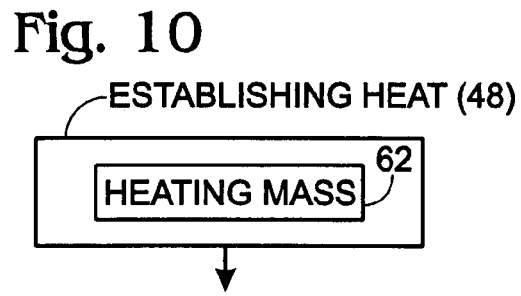
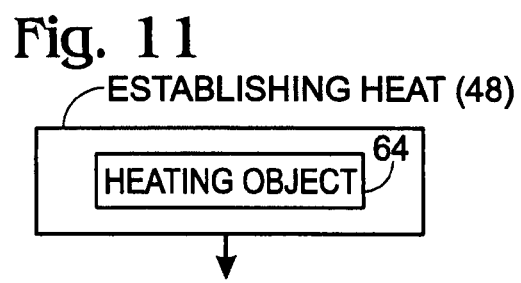
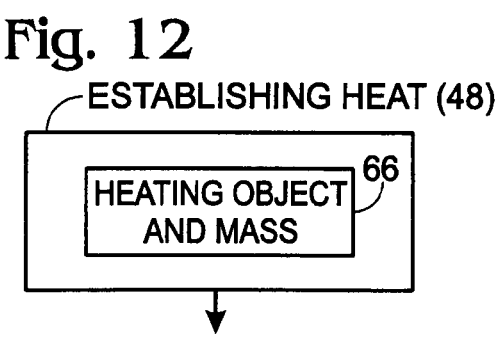

METHOD OF MAKING AN EMBEDDED-OBJECT AND COMPOSITE-MATERIAL PRODUCT

CROSS REFERENCE TO RELATED APPLICATION

This application claims filing-date priority to U.S. Provisional Patent Application Ser. No. 60/838,457, filed Aug. 16, 2006, for "Embedment Manufacturing Procedure and Structures Produced Thereby". The entire disclosure content of that provisional application is hereby incorporated herein by reference.

BACKGROUND AND SUMMARY OF THE INVENTION

This invention relates to a unique manufacturing technique involving the manufacturing embedment of one or more different kinds of component(s) into a heat, and applied-pressure, state-change receiving material, and to various types of resultant composite-material products produced thereby. The invention is particularly illustrated and described herein in relation to such a manufacturing technique which results in the creation of a variety of special-purpose panel structures which may be designed and configured to perform unique functions, and to possess unique composite characteristics that are useful, in many different end-use applications. While such panel structures serve well to illustrate the advantages and versatility of the invention, and accordingly have been chosen herein as appropriate invention-disclosure "vehicles", but it should be clearly understood that non-panel, composite-material products are just as readily and advantageously produced in accordance with the practice and features of the invention.

Fundamentally the invention involves, in terms of a preferred manufacturing technique, the use of appropriate heat and a slight amount of simultaneously applied pressure, in the context of relative-motion pressure-"driving" a chosen, embeddable object into a mass of specially selected, temporarily flowable receiving material—a receiving material which readily accommodates a selectively reversible, non-destructive phase, or state, change from solid to liquid-flowability, thus to permit a resultant embedding of the chosen object in the material. With this fabrication approach, different kinds of useful objects, such as fabric living hinges, fastening devices, wiring, fluid-conduit structures, acoustic sensors, radioactivity sensors, thermal sensors, radio antennae, and many others may be incorporated securely in surrounding, dimensionally and configurationally stabilized support material for otherwise normal functioning therein. For example, a specialized vehicle door panel, shaped appropriately for a particular vehicle and use application, might, in accordance with the practice of the invention, be embedment-formed with an embedding-material main body carrying embedded fabric living hinges, embedded radio-transmission antenna wiring, electrical heating wiring, outwardly accessible fasteners adapted to accommodate the attachment of various external hardware, and so on.

An especially interesting feature is that small embedded objects, such as fasteners, having shapes which, on balance, lack, in an overall sense, axes and overall outer surfaces of revolution, such as hex-head and square-head nuts, may be embedded easily to become fully stabilized against loosening rotation within the selected embedding receiving material. Another interesting feature is that all aspects of embedment as practiced in accordance with the invention involve no material removal (and hence material waste) steps. A further feature to note is that embedment "binding" of an embedded object in place in the embedding receiving material occurs without the need for any auxiliary adhesives.

From the several specific illustrations given here, and hereinbelow, those skilled in the art will quickly appreciate the special utility of the present invention.

The selected, special material in which embedment takes place, also referred to as an embedding-and-object-receiving (EOR) material, preferably takes the form of a closed-cell, thermoformable foam material designated by the initials PET, which initials stand for the material known as polyethylene terephthalate. While different, specific thermoformable PET materials may well be chosen for use in the practice of this invention, we have found currently that a particularly preferred material is a polyethylene terephthalate, closed-cell, 6-24# foam product made by Sealed Air Corporation in Saddlebrook, N.J. An excellent body of technical information relating to this PET material, herein referred to also simply as PET, is available from the well known Internet source of wide-subject-matter general information known as Wikipedia, The Free Encyclopedia.

We have discovered that this PET material, through the appropriate introduction thereinto of appropriate heat of above about 300-degrees F., changes from a solid state to a "precursor" flowable state, without vaporization or flaming. This state change to initial material flowability then affords the opportunity, utilizing a very slight amount of relative-motion pressure, such as about 5-10-psi, easily to embed, into a portion of a mass of such heated PET, fully or partially, different kinds of objects, such as those just suggested above.

In accordance with practice of the invention, pressing of an object into the thus-heated, "now-flowable" PET mass region, causes PET material to yield appropriately, and entirely "locally", to the "incoming" object, and to flow, compress, and "gradient densify" (to be explained shortly) in a zone of the PET region immediately surrounding and adjacent the embedded object. Preferably, though not necessarily, relative-motion embedment is progressed to the point where what then becomes the outermost, exposed portion of the embedded object is substantially flush with the particular surface of the PET mass into which embedment has taken place.

Significantly, with such zonal gradient densification occurring—a declining densification progressing outwardly from the embedded object into the surrounding PET material—the collective post-embedment volume of (a) the embedding PET material, and (b) of the portion, or the whole, of the embedded object, is substantially equal to the starting, selected (predetermined) volume of just the initial PET material alone. This feature, which is referred to herein as a volume maintenance feature, uniquely allows for precise, overall product-configuration, dimensional-tolerance control in a pre-planned, final, composite-material product simply through the pre-selection of the shape and size of the receiving PET material, and through relying on local-embedment-region, or zone, PET-material gradient densification to maintain and control final product size, etc., by not swelling the overall size of the original, starting mass of PET material.

Subsequent cooling of the PET material following heating and embedding of a selected object, we have observed, causes in all cases a good mechanical bond to establish between the PET material and the received object. This bond functions very successfully to anchor the received object with the PET material. Bond security is, of course, enhanced where the outside configuration of an embedded object has appropriate "protrusions" that cause the object to become positively "captured" within the embedding material.

With heating and flowing of the PET material during the embedment process, as just generally outlined, because of the relative-motion embedment pressure which is employed, the mentioned PET-material gradient-densification which then occurs creates an important PET continuous density gradient in the "immediately adjacent" zone of embedding PET material (i.e., immediately adjacent the embedded object), which gradient functions as a strengthened region around a received object. This region, which has a density gradient characterized by greater PET density directly next to the embedded object, "tapering" to "normal" PET density a short distance away from the embedded object, is without any internal, sharp-discontinuity, stress-risers. This strengthened region both provides a "hardened", protective jacket adjacent the associated embedded object, and also acts like an internal, structural reinforcing element within the PET material per se—an "element" which is very useful in certain applications. For example, a vehicle door panel prepared with embedded winds or reverse-bend loops of radio antenna wire in accordance with practice of the invention, effectively possesses an invisible, wire-shape-matching internal stiffening brace.

Thus, we have determined that, utilizing such PET material, along with certain, selected "embedment" materials and objects, it is possible to create a wide range of extremely versatile and useful structures, such as panel structures, or panels, in which embedded objects, put into place in accordance with practice of this invention, can provide a number of useful, different, "embedded-object" functions. For example, and repeating in certain instances illustrations which have already been given, panels which may be used on various structures, such as buildings, boats, airplanes and other vehicles, may carry (a) embedded wiring for heating or radio-reception/transmission purposes (as well as for other purposes), (b) embedded fluid conduits for carrying various kinds of fluids, such as heating and cooling fluids, (c) different kinds of embedded sensors, such as acoustic sensors, heat sensors, radioactivity sensors, and so on, (d) various fabrics, for selected purposes, and (e) many other kinds of embedded objects, like various reception-attaching, or fastening, devices such as screw-threaded nuts, hardware hinges, etc.

With regard, as an illustration, to the embedment typically (although not exclusively) of relatively-small fastening devices, a very unique procedure proposed herein involves the practice of heating a to-be-received (embedded) fastening device to an appropriate temperature (such as around 300° F.), and then, utilizing modest, relative-motion pressure, simply advancing this heated device into the PET material to cause localized PET melting and flowing to accommodate embedment. In this specific practice approach of the invention, heat from the heated "to-be-embedded" device operates at the contact interface which develops and exists between this device and the receiving (embedding) PET material to cause an appropriate, local PET state change from solid to effectively flowable liquid.

In one modified form of the invention, the surface of a PET mass into which embedment is to take place is first covered with a fibre-strand-reinforced thermoformable plastic layer material, such as the material sold under the trademark Polystrand®, manufactured by a company having the same name, Polystrand, in Montrose, Colo. The plastic in this layer material is preferably made of polypropylene, and the reinforcing strands are preferably made of E-glass. This layer material, which may actually be formed from plural (such as about twelve) sub-layers of the same material, might typically have an overall thickness of about 0.16-inches. The plastic in this layer solid-to-flowability state-change preferably has a melting temperature like that of PET.

These and other features and advantages which are offered by the present invention will become more apparent shortly as the detailed description of the invention presented below is read in conjunction with the accompanying drawings.

DESCRIPTION OF THE DRAWINGS

FIG. 1 is a high-level, fragmentary, schematic illustration of a preferred and best mode form of the invention.

FIG. 2 is a high-level, fragmentary, schematic illustration of a modified form of the invention.

FIG. 3 is an exploded, fragmentary, schematic drawing showing an implementation of the form of the invention pictured generally in FIG. 1. Specifically, FIG. 3 illustrates the embedment into a panel-like mass of PET material of a serpentine length of an elongate, slender object, such as a wire-like object, or alternatively a tube-like object. This figure also illustrates the optional single or dual facial cladding of a finished panel-like structure with one or two sheets of a fibre-strand-reinforced layer material, such as the Polystrand® material mentioned above. As will be explained below, FIG. 3 is presented in a manner allowing it to be read from several, different points of view.

FIG. 4 is a fragmentary cross section taken generally along the line 4-4 in FIG. 3.

FIG. 5 is an enlarged, fragmentary view taken generally in the region in FIG. 4 which is embraced by the curved arrows shown at 5-5.

FIG. 6 is a fragmentary, isometric view showing a composite panel structure possessing one type of an embedded fastener. The particular fastener illustrated is one having a square embedded head, and is thus in the category mentioned earlier herein as being defined with a shape which, on its outside, does not have an overall surface of revolution curving about a related axis of revolution.

FIG. 7 is an enlarged, fragmentary view taken generally along the line 7-7 in FIG. 6. This view is drawn, additionally, to illustrate the modified practice of the invention generally shown in FIG. 2.

FIGS. 8-15, inclusive, are block/schematic illustrations showing several different ways of expressing the methodology of the present invention.

DETAILED DESCRIPTION OF THE INVENTION

Figure 13:
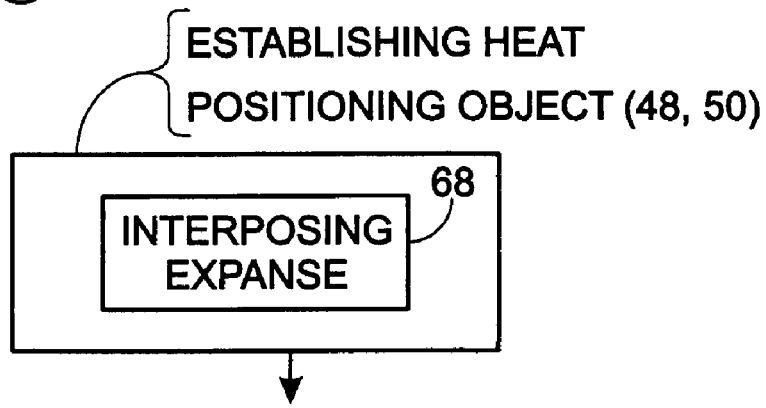

Turning attention now to the drawings, and referring first of all to FIG. 1, indicated generally at 20 is an organization of both embedding and embeddable components which are to become united through an embedment procedure in accordance with practice of a preferred and best mode form of the present invention (structure and methodology) to become an embedded-object composite product. For the purpose solely of illustration herein, organization 20 is intended to become a panel-like, or panel, product, though it should be clearly understood that a "final-result" composite product need not necessarily be panel-like in nature.

Two core components are involved specifically in what is shown in FIG. 1, with these components including a panel-like body, or mass, 22 of PET material having opposite, upper and lower, faces 22a, 22b, respectively in FIG. 1, and an embeddable object 24 which is simply represented in FIG. 1 schematically as a simple, rectangular form. The PET material which is used to form the body of panel 22 is the same PET material described earlier herein, having a precursor state-change temperature of around 300° F. It should be understood that what is being referred to herein as a precursor state-change temperature is that temperature which at least begins to accommodate a condition of liquid flowability in the PET material. Transition (state-change) of this PET material, at about the mentioned temperature of about 300° F., is a non-destructive, reversible transition.

Object 24 will be referred to herein as being a metallic object, though this is not in any way a constraint associated with practice of the invention.

In solid outline in FIG. 1, object 24 is shown in a condition closely juxtaposed panel 20, above face 22a, with a region 26, which is generally interposed panel 22 and object 24, being shown laterally embraced by a pair of double-headed, curved arrows 28, 30. Region 26 herein, about which more will be said shortly, constitutes what is also referred to as a prospective contact-interface region intended "ultimately" to exist (in a somewhat different specific form) as an embedment interface between panel 22 and object 24. The letter H pictured in FIG. 1, along with a single-headed, serpentine arrow 32 which extends from H toward region 26, illustrates the practice of the present invention involving a heating step, also referred to herein as the establishing of a level of heat which, when exposed to a selected mass region, or portion, of PET panel 22 (in the vicinity of interface region 26), is sufficient to cause that portion to undergo a non-destructive and reversible state change from solid to flowable-liquid.

In a dashed line at 24A in FIG. 1, object 24 is shown in a condition of embedment in PET panel 22, and specifically in a condition of embedment in this body immediately adjacent panel face 22a, with the uppermost portion of object 24 lying substantially in a co-planar relationship with face 22a. Under these circumstances, i.e. circumstances where object 24 is in the embedded condition illustrated in FIG. 1 relative to panel 22, the "embedment" contact-interface region which then exists between object 24 and panel 22 is said to be a realized contact-interface region, and this realized region is essentially coincident with the dashed outline shown for object 24 as it appears in FIG. 1 at 24A. This condition of the "realized" contact-interface region is the "different specific form" of such a region which was mentioned briefly earlier herein.

Two other components—optional components—are shown at 34, 36 in FIG. 1, with component 34 lying above object 24 in this figure, and component 36 lying beneath panel 22. Each of components 34, 36 takes the form of an expanse, or layer, of the Polystrand® material mentioned earlier herein, and the reason for showing these two layer components in FIG. 1 will be explained shortly.

In order to produce a composite-material product with object 24 embedded as shown in PET panel 22, heat is applied effectively in region 26 at a level which is sufficient to cause a state-change from solid to flowable-liquid in an appropriately sized and selected portion of the PET material intended to receive, by embedment, object 24. Under this condition, object 24 is relative-motion advanced (see arrow 27 in FIG. 1) toward, and pressed into, that flowable, liquefied portion of panel 22, and specifically into panel face 22a, utilizing relatively modest pressure, such as the earlier-mentioned pressure in the range of around 5-10-psi.

Heating to a process temperature of about 300° F. the mentioned "embedment-receiving" portion of the PET panel material may be accomplished in any one of several different ways. One of these ways includes applying heat directly, and solely only, to the PET material, per se, in region 26. Another approach involves simply heating object 24 alone to an appropriate temperature whereby, when it is pressed into contact with the PET material, it will effect a solid-to-liquid state change in the PET material which will allow pressure embedment of the object. A third heating approach involves heating both panel 22 and object 24 in the region (26) embraced by arrows 28, 30.

With each of these heating approaches, object embedment is enabled wherein flowing PET material closes tightly upon the portion of that object which is pressed into the PET material. PET gradient densification occurs during embedding of the object, and this densification causes the unique "volume maintenance" feature of the invention described earlier. This volume maintenance feature ensures dimensional tolerance maintenance of the initial outside dimension(s) and configuration of the starter body of PET material.

Following complete and proper embedment of object 24, and as a consequence thereof, there exists within the PET material a density gradient zone 22A which transitions continuously (i.e., without any discontinuity), and with spatial declination, from relatively dense in the locations immediately adjacent the embedded object, to the lesser, normal density of the PET material, per se. More will be said later about this density gradient zone, also referred to herein as a "declining, transitioning gradient" zone, which becomes created during object embedment.

Following proper embedment of object 24, the composite, "embedded assembly" of components 22, 24 is allowed to cool in a manner causing the selected region of PET material which became flowable to go through a state change from liquid to solid. When this change has occurred, object 24 is securely embedded and anchored in the PET material, and the desired, end-result, composite-material product is fully created.

In certain instances, for example, for added-strength purposes, it may be desired to clad one or both of faces 22a, 22b with a material such as that described for layer components 34, 36. These layer components, or one of them, may readily be applied to a selected face in the embedment-process structure through appropriate heat application and associated pressure to achieve thermal-clad-bonding of the composite product and the selected cladding layer.

FIG. 2 is very similar to FIG. 1, except that it illustrates a modified form of the invention wherein, at a suitable point in time prior to the relative-motion pressure action of embedment, a layer component 38 (which is like previously described layer components 34, 36) is placed on face 22a in panel 22, and then fabrication steps as just described immediately above with respect to FIG. 1 are performed. In this circumstance, embedment of object 24 causes layer component 38 to be driven locally into the PET material, as is indicated generally by the dash-double-dot line shown at 38A in FIG. 2.

Again, an additional surface-cladding layer, or layers, such as layers 34, 36, may be applied to one or both of panel face(s) 22a, 22b in FIG. 2.

FIGS. 3-5, inclusive, basically illustrate what has just been described above with respect to FIG. 1, with reference being made in these several figures to a situation in which object 24 (shown in dash-double-dot lines in a pre-embedment condition in FIGS. 3 and 4) takes the form of a serpentine length of an elongate component which is specifically illustrated in FIGS. 3-5, inclusive, as being a solid, metallic wire-like, or wire, element. This element might be part (or all) of a radio antenna, part (or all) of electrical resistance wiring, or part (or all) of any elongate, wire-like element (such as a fluid-conduit element) intended for any one of a variety of end-result uses. In these three figures, reference characters like those used in FIGS. 1 and 2 are employed for comparable structures.

As was just mentioned above, in FIGS. 3 and 4, element 24, labeled as such, is shown elevated above PET panel body 22 in a pre-embedment condition. This same element is shown on solid lines at 24A in an embedded condition in panel 22.

With elongate element 24 in FIGS. 3-5, inclusive, in a fully embedded condition in panel 22 (see 24A), and referring now particularly to FIGS. 4 and 5, the earlier-mentioned transitioning, declining density gradient zone in the PET material is illustrated at 22A in FIGS. 3, 4 and 5. This density-gradient zone is detailedly illustrated, with several varied characters of shading, in FIG. 5, thus to picture, illustratively, four, different, transitioning-density zonal regions A, B, C, D, which, progressing from zonal region A, the region which is immediately next-adjacent embedded object 24, declines in density from region-to-region, until finally "reaching" region E which is characterized by the normal, nominal, solid-state density of PET material in panel 22.

This zone (22A) which possesses the mentioned density gradient furnishes reinforced support around embedded object 24, and additionally acts somewhat like an internal reinforcing structure, or brace, within the PET panel material, per se.

FIGS. 6 and 7 illustrate composite-material product structure made in accordance with practice of the present invention wherein two, square-head fasteners, 40, 42, possessing conventional, threaded, internal bores 40a, 42a, respectively, which extend along respective long axes 40b, 42b, respectively, have been embedded in a body, or mass, 44 of panel-like (panel-body) PET material. FIG. 7 may be viewed, as will be explained, so as to see two different embodiments of the invention.

In one invention embodiment which is pictured in both FIGS. 6 and 7, fasteners 40, 42 are simply directly embedded in the mentioned PET material mass. In FIG. 7, a dash-double-dot line 46a effectively illustrates that form of the invention which was previously described with respect to FIG. 2 herein. Specifically, this dash-dot line illustrates a situation where a Polystrand® layer 46 is in place on the embedment surface 44a (see FIG. 6) of PET mass (panel body) 44 prior to embedment of the illustrated fasteners. FIG. 7 also illustrates, at 44A the presence around fastener 40 of the same kind of PET-material density gradient zone which is pictured at 24A in FIGS. 1-5, inclusive.

The presence of fasteners 40, 42 of square heads which are embedded in PET panel 44 positively assures that use of these fasteners will not cause them to rotate free of being bound in the PET material.

As those skilled in the art will appreciate, various forms of fasteners may be utilized in the practice of the invention, including fasteners which are accessible from one surface only of the associated PET material, or possibly accessible from opposite sides of such material.

Turning attention now to FIGS. 8-15, inclusive, as was mentioned earlier herein, these several figures illustrate different ways of viewing the methodology of the present invention.

From one point of view, as seen in FIG. 8, the present invention involves a method of forming an embedded-object, composite-material product utilizing a solid-state mass of PET as an embedding-and-object-receiving (EOR) material. This method approach includes the steps of (a) establishing (block 48), in a prospective contact-interface region intended ultimately to exist between an embedded object and a selected, solid-state mass of EOR material, a level of heat which, when exposed to that selected mass, is sufficient to cause EOR material therein to undergo a reversible state change from solid to flowable liquid (see FIG. 1), (b) positioning an object (block 50) which is to be embedded in the EOR mass, and the mass per se, in relative juxtaposition adjacent the intended contact-interface region (see FIG. 1), (c) with such positioning accomplished, and using relative-motion pressure adjacent the intended contact-interface region, advancing the to-be-embedded object (block 52) into an embedded and received condition in the EOR material mass utilizing liquid flow in the EOR mass to accommodate such embedment (see FIG. 1), (d) by such advancing, realizing (block 54) the once-intended contact-interface region between the now-embedded object and the EOR mass (see FIG. 1), (e) following the realizing step, cooling (block 56) the realized contact-interface region to return the EOR material therein to a solid state, and (f) by such cooling, creating the intended, embedded-object, composite-material product (block 58).

FIG. 9, in a block labeled 60, further describes the methodology pictured in FIG. 8, doing so in a manner which points out that the "realizing step" (block 54) includes the further step of producing a zone possessing a continuous, declining, material-density gradient in the EOR mass material (see especially FIGS. 4, 5 and 7), with more-dense EOR material in the mass residing closely adjacent the embedded object, and less-dense EOR material in the mass residing more distant from the embedded object.

FIG. 10, in a block labeled 62, further describes the methodology pictured in FIG. 8 to be one wherein the "establishing step" is performed by directly and solely heating the EOR material mass.

FIG. 11, possessing an included block 64, additionally describes the methodology expressed in FIG. 8 as one in which the "establishing step" is performed by directly and solely heating the to-be-embedded object.

FIG. 12, in a block labeled 66, further recognizes the methodology pictured in FIG. 8 as being one wherein the 'establishing step' is performed by heating both the object and the EOR material mass.

FIG. 13, with an illustrated, included block labeled 68, further elaborates the methodology described in FIG. 8 as being one which includes an additional, pre-embedment step of interposing an expanse of fiber-strand-reinforced plastic material between the to-be-embedded object and the EOR material mass, where the plastic material included in the expanse responds to heating and cooling in the manner generally described for the EOR material mass.

Figure 14:
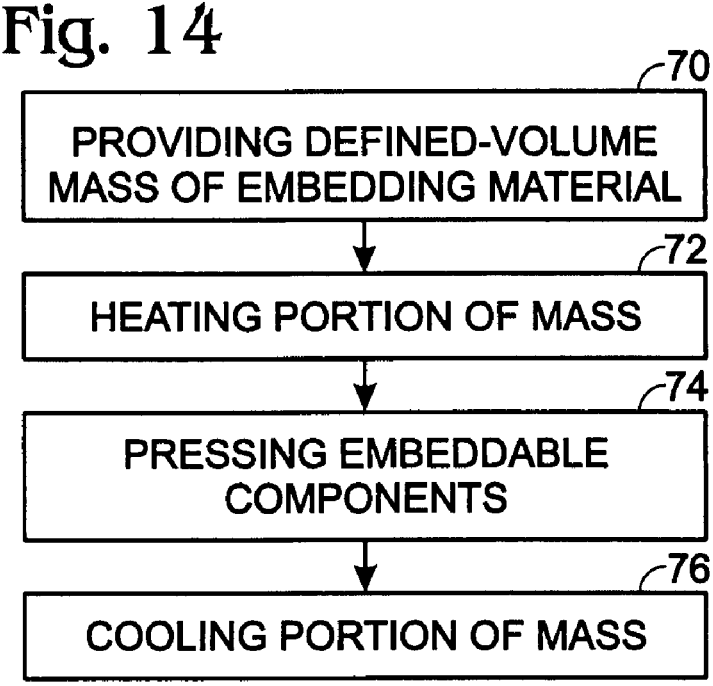

FIG. 14 illustrates, in four blocks 70, 72, 74, 76, yet another way of envisioning the methodology of the present invention. According to this view, the invention takes the form of a method of uniting embedding and embeddable components including the steps of providing, in a solid-state condition, and as an embedding component, a predetermined-volume mass of an embedding material which is non-destructively heatable and coolable to switch reversibly between solid and liquid states (block 70), heating, in relation to a selected embeddable component, at least an appropriately sized portion of the provided mass to liquefy that portion (block 72), pressing at least a portion of the selected embeddable component completely into the liquefied mass portion thereby to produce a condition of embedment wherein the overall embedding-component material and the embedded portion of the embeddable component collectively possess a volume substantially equaling the mentioned predetermined-volume (block 74), and thereafter, cooling the liquefied embedding-material mass portion to solidify it (block 76).

Figure 15:
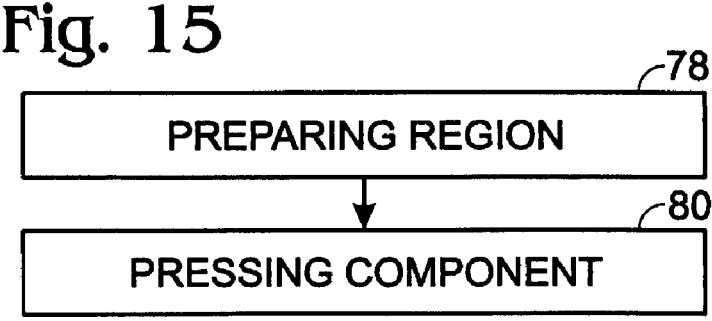

Finally, FIG. 15 shows in two blocks, 78, 80, still one further way of viewing the invention methodology. From this vantage point, the invention may be described as being a method of forming, without material removal, a composite-material, embedded-component product including the steps of preparing an embedment-receiving region in a body of a receiving component without removing material from that body, and, also without performing any material-removal action, but in a manner reducing the volume of the receiving component without changing its basic outside dimensions or configuration (block 78), and pressing an embedment component at least partially into the prepared embedment-receiving region to produce the desired embedded-component product (block 80), wherein, within and throughout the embedment-receiving region, an overall, intimate contact interface exists between the receiving and embedded components.

While just a few panel-like resulting devices have been mentioned and are illustrated herein, and while certain formation procedures have been described, it will apparent to those skilled in the art that many other useful PET-embedded devices, and techniques for producing embedment thermally, may be thought of by those generally skilled in the relevant art. It will be apparent, for example, that, with respect to the making of various unique panel structures, it is possible to create what may be thought of as being "smart panels" which include PET-embedded hardware capable of functioning in various ways.

We claim:

1. A method of forming an embedded-object, composite-material product utilizing a solid-state mass of PET as an embedding-and-object-receiving (EOR) material, said method comprising
   establishing, in a prospective contact-interface region intended ultimately to exist between an embedded object and a selected, solid-state mass of EOR material, a level of heat which, when exposed to that selected mass, is sufficient to cause EOR material therein to undergo a non-destructive, reversible state change from solid to flowable-liquid,
   positioning an object which is to be embedded in the EOR mass, and the mass per se, in relative juxtaposition adjacent the intended contact-interface region,
   with said positioning accomplished, and using relative-motion pressure adjacent the intended contact-interface region, advancing the to-be-embedded object into an embedded and received condition in the EOR material mass utilizing liquid flow in the EOR mass to accommodate such embedment,
   by said advancing, realizing the once-intended contact-interface region between the now-embedded object and the EOR mass,
   following said realizing, cooling the realized contact-interface region to return the EOR material therein to a solid state, and
   by said cooling, creating the intended, embedded-object composite product.

2. The method of claim 1, wherein said realizing includes producing a zone possessing a continuous material-density gradient in the EOR material mass, with more-dense EOR material in the mass residing closely adjacent the embedded object, and less-dense EOR material in the mass residing more distant from the embedded object.

3. The method of claim 1, wherein said establishing is performed by directly and solely heating the EOR material mass.

4. The method of claim 1, wherein said establishing is performed by directly and solely heating the object.

5. The method of claim 1, wherein said establishing is performed by directly heating both the object and the EOR material mass.

6. The method of claim 1 which further comprises pre-embedment interposing of an expanse of fibre-strand-reinforced plastic material between the object and the EOR material mass, where the plastic included in the expanse responds to heating and cooling in the manner described for the EOR mass material.

7. A method of uniting embedding and embeddable components comprising
   providing, in a solid-state condition, and as an embedding component, a predetermined-volume mass of an embedding material which is non-destructively heatable and coolable to switch reversibly between solid and liquid states,
   heating, in relation to a selected embeddable component, at least an appropriately sized portion of the provided mass to liquefy that portion,
   pressing at least a portion of the selected embeddable component completely into the liquefied mass portion thereby to produce a condition of embedment wherein the overall embedding-component material and the embedded portion of the embeddable component collectively possess a volume substantially equaling the mentioned predetermined-volume, and
   thereafter, cooling the liquefied embedding-material mass portion to solidify it.

8. A method of forming, without material removal, a composite-material, embedded-component product comprising
   preparing an embedment-receiving region in a body for an embeddable component of a receiving component without removing material from that body. including heating, in relation to a selected embeddable component, at least an appropriately sized portion of the provided body to liquefy that region, and
   also without performing any material-removal action, but in a manner reducing the volume of the receiving component, pressing an embedment component at least partially into the prepared embedment-receiving region to produce the desired embedded-component product, wherein, within and throughout the embedment-receiving region, an overall, intimate contact interface exists between the receiving and embedded components.

* * * * *